US012809432B2

(12) United States Patent
Tsou et al.

(10) Patent No.: US 12,809,432 B2
(45) Date of Patent: Nov. 24, 2026

(54) SYSTEMS AND METHODS FOR DYNAMICALLY SWITCHING DEVICE CONFIGURATION THERMAL PARAMETERS

(71) Applicant: ZEBRA TECHNOLOGIES CORPORATION, Lincolnshire, IL (US)

(72) Inventors: Cho Yin Tsou, Round Rock, TX (US); Dennis Barrett, Allen, TX (US)

(73) Assignee: Zebra Technologies Corporation, Lincolnshire, IL (US)

( * ) Notice: Subject to any disclaimer, the term of this patent is extended or adjusted under 35 U.S.C. 154(b) by 425 days.

(21) Appl. No.: 18/133,090

(22) Filed: Apr. 11, 2023

(65) Prior Publication Data

US 2023/0359255 A1 Nov. 9, 2023

Related U.S. Application Data

(60) Provisional application No. 63/338,789, filed on May 5, 2022.

(51) Int. Cl.
*G06F 1/20* (2006.01)
*G06F 1/16* (2006.01)

(52) U.S. Cl.
CPC ............ *G06F 1/206* (2013.01); *G06F 1/1632* (2013.01)

(58) Field of Classification Search
CPC ...... G06F 1/206; G06F 1/1632; G06F 1/3215; G06F 1/324; G06F 1/3296; G06F 1/20
See application file for complete search history.

(56) References Cited

U.S. PATENT DOCUMENTS

| | | | | |
|---|---|---|---|---|
| 2015/0043156 A1* | 2/2015 | Jain | G06F 1/206 | 361/679.46 |
| 2016/0091938 A1* | 3/2016 | Edwards | G06F 1/206 | 700/300 |
| 2017/0168531 A1* | 6/2017 | Casparian | G06F 1/206 | |
| 2019/0129482 A1* | 5/2019 | Todrzak | B60R 11/02 | |

* cited by examiner

*Primary Examiner* — Zhipeng Wang

(57) ABSTRACT

Systems and method for dynamically switching thermal parameters of a device are disclosed herein. The method detects a hardware attachment or detachment event via a detection mechanism of the device and stores an initial configuration of the device and the detected hardware attachment or detachment event. The method generates a table having one or more sub tables based on the stored initial device configuration and the detected hardware attachment or detachment event. The method optimizes a performance of the device by dynamically switching the thermal parameters of the device based on the detected hardware attachment or detachment event and the table.

10 Claims, 10 Drawing Sheets

250

| | Table Type | Description |
|---|---|---|
| 252 | Main thermal table entry pointer | Offset to sub thermal tables. |
| 254a | Thermal sub table 1 entry pointer | Device by itself with no fan installed |
| 254b | Thermal sub table 2 entry pointer | Device by itself with a fan installed |
| 254c | Thermal sub table 3 entry pointer | Device with a keyboard attached |
| 254d | Thermal sub table 4 entry pointer | Device in a dock station |

FIG. 3

SYSTEMS AND METHODS FOR DYNAMICALLY SWITCHING DEVICE CONFIGURATION THERMAL PARAMETERS

BACKGROUND

A device (e.g., a mobile computer or tablet) can be configured utilizing different accessories into different form factors including, but not limited to, a hand-held device, a device with an attached accessory (e.g., a keyboard, a mouse, etc.), and a device docked with a desktop or vehicle having an external monitor and/or other attached devices and/or accessories. Different form factors (e.g., configurations) have different performance requirements which drive different thermal characteristics.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a table illustrating a thermal table and sub tables associated with different device configurations.

Figure 1:
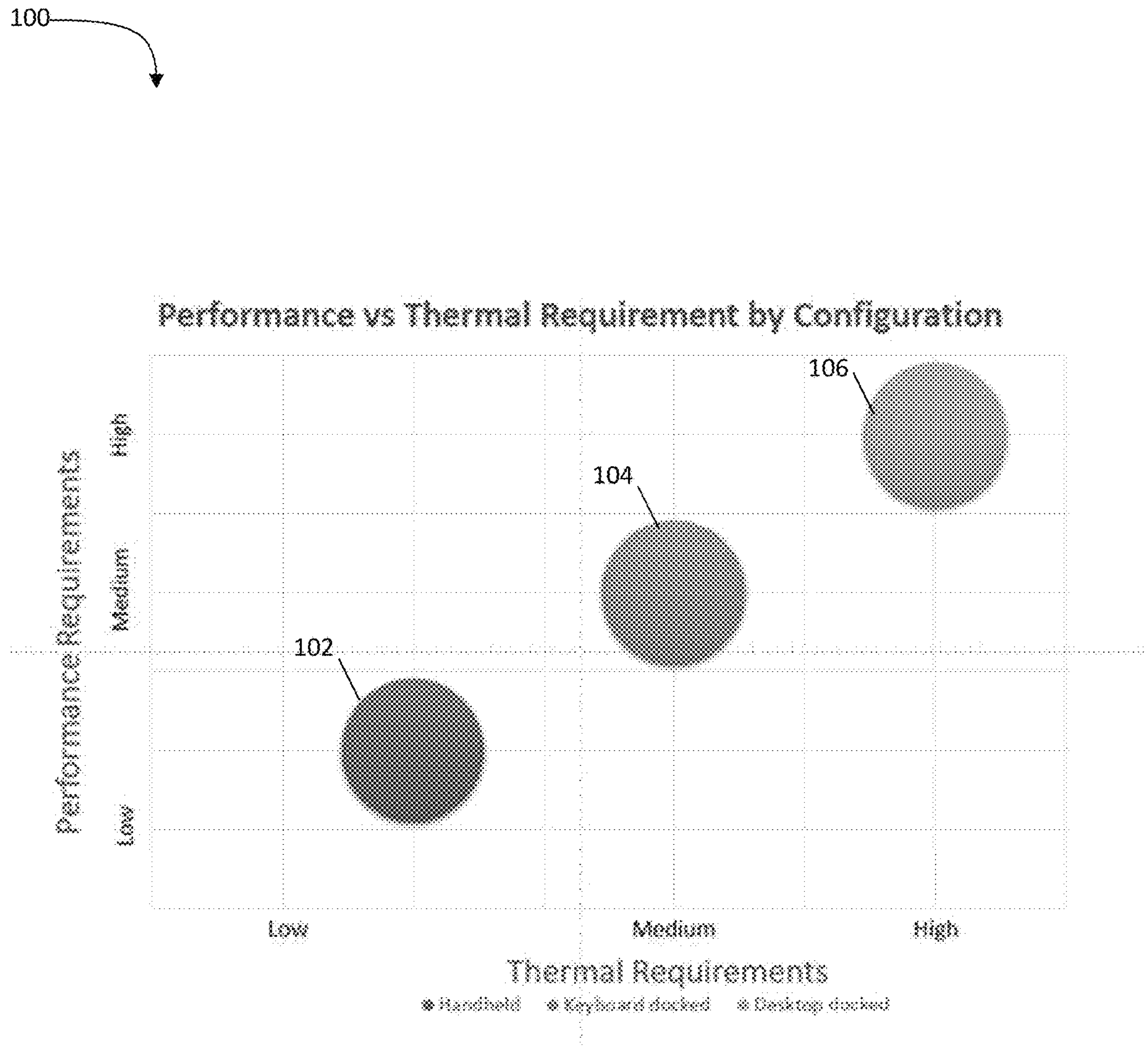
FIG. 1 is a diagram illustrating performance and thermal requirements for different device configurations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a system for dynamically switching thermal parameters of a device comprising a memory configured to store computer executable instructions; and a processor configured to interface with the memory and execute the computer executable instructions to cause the processor to: detect a hardware attachment or detachment event via a detection mechanism of the device, store an initial configuration of the device and the detected hardware attachment or detachment event, generate a table having one or more sub tables based on the stored initial device configuration and the detected hardware attachment or detachment event, and optimize a performance of the device by dynamically switching the thermal parameters of the device based on the detected hardware attachment or detachment event and the table.

Additional examples disclosed herein are directed to a method for dynamically switching thermal parameters of a device, comprising: detecting a hardware attachment or detachment event via a detection mechanism of the device; storing an initial configuration of the device and the detected hardware attachment or detachment event; generating a table having one or more sub tables based on the stored initial device configuration and the detected hardware attachment or detachment event; and optimizing a performance of the device by dynamically switching the thermal parameters of the device based on the detected hardware attachment or detachment event and the table.

Additional examples disclosed herein are directed to a system for dynamically switching thermal parameters of a device comprising a memory configured to store computer executable instructions; and a processor configured to interface with the memory and execute the computer executable instructions to cause the processor to: detect a hardware attachment or detachment event via a detection mechanism of the device, receive at least one of device sensor data and detected hardware attachment or detachment event sensor data, and optimize a performance of the device by dynamically switching the thermal parameters of the device based on the detected hardware attachment or detachment event and the received at least one of the device sensor data and the detected hardware attachment or detachment event sensor data.

Additional examples disclosed herein are directed to a method for dynamically switching thermal parameters of a device, comprising: detecting a hardware attachment or detachment event via a detection mechanism of the device; receiving at least one of device sensor data and detected hardware attachment or detachment event sensor data; and optimizing a performance of the device by dynamically switching the thermal parameters of the device based on the detected hardware attachment or detachment event and the received at least one of the device sensor data and the detected hardware attachment or detachment event sensor data.

As mentioned above, different form factors (e.g., configurations) have different performance requirements which drive different thermal characteristics. FIG. 1 is a diagram 100 illustrating performance and thermal requirements for different device configurations. As shown in FIG. 1, a handheld (e.g., standalone) device configuration 102, a keyboard docked device configuration 104 and a desktop docked device configuration 106 each have different performance requirements which drive different thermal requirements.

A known approach for addressing this issue is tuning device performance according to a configuration to run at lower frequencies to maintain a required thermal level. However, this approach can impede an experience of a user of the device. For example, if a device is tuned for a hand-held device configuration, then the device will not have the required performance of a desktop docked device configuration. Alternatively, if a device is tuned for a desktop docked device configuration, then the thermal requirements can be too high and render the device unsuitable for extended periods of hand-held operation.

Additionally, regulatory requirements set different skin (e.g., housing) temperature limitations for different device configurations (e.g., handheld vs. docked). For example, a handheld device (e.g., a tablet) configuration has a lower skin temperature requirement because a user holds and contacts the handheld device for a long period of time whereas a docked device (e.g., desktop) configuration has a higher skin temperature upper limit requirement because a user contacts the desktop docked device for a limited period of time.

Generally, a user reconfigures a device between handheld and docked device configurations. Known dynamic tuning technology (DDT) architecture (e.g., Intel® DTT) requires a user to shutdown, cold boot or warm boot a device to reset the DTT settings (e.g., a DTT table) thereof. As such, known DDT architecture cannot dynamically switch device DTT settings based on different device configurations. For example, if a device is booted in a docked configuration and subsequently removed from a docking station, then the device will continue to utilize a docked configuration DDT table that can yield a higher skin temperature. To resolve this, a user must cold boot or warm boot the device to switch to a handheld configuration DTT table.

Accordingly, it would be highly beneficial to develop a system and method that can detect a device configuration and dynamically switch the DTT settings of the device based on the detected device configuration while the device (e.g., an operating system thereof) is in an operational state (e.g., running). In this way, the system and method can dynamically switch the DTT settings of the device without shutting down or rebooting the device which delays the operation of the device and impedes user experience. The systems and methods of the present disclosure address these and other needs.

Figure 2:
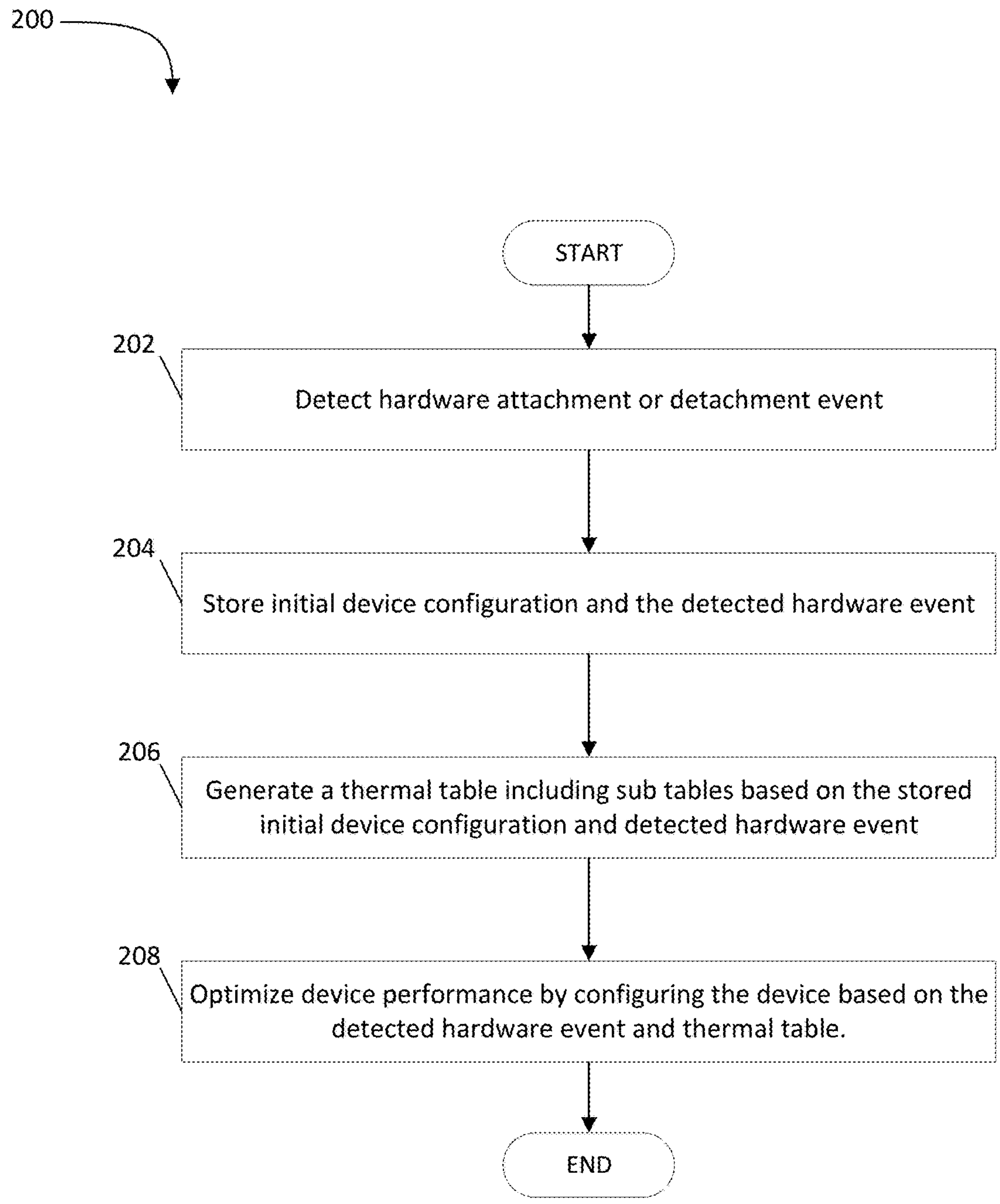
FIG. 2 is a flowchart illustrating overall processing steps carried out by an embodiment of the system of the present disclosure.

FIG. 2 is a flowchart 200 illustrating overall processing steps carried out by an embodiment of the system of the present disclosure. As described in further detail below, the system can detect a hardware attachment or detachment event via a real time detection mechanism (e.g., one or more detection pins), generate a thermal table including sub tables based on the detected hardware attachment or detachment event and dynamically switch between different DTT tables, while the device is running, based on the thermal table and detected device configuration.

Beginning in step 202, the system can detect a hardware attachment (e.g., docking) or detachment (e.g., un-docking) event. The system can utilize a real time detection mechanism (e.g., one or more detection pins) to detect the hardware (e.g., a keyboard or dock) attachment or detachment event in real time. The system can set an integer value of a variable in response to the detected hardware attachment or detachment event. For example, in response to a detected docking event, the system can set the variable value to one which is indicative of a docked device configuration (e.g., DOCKED=TRUE). Alternatively, in response to a detected un-docking event, the system can set the variable value to zero which is indicative of a handheld device configuration (e.g., DOCKED=FALSE).

In step 204, the system can store an initial device configuration and one or more detected hardware attachment or detachment events. Then, in step 206, the system can generate a thermal table including thermal sub tables associated with different device configurations based on the stored initial device configuration and the one or more detected hardware attachment or detachment events. FIG. 3 is a thermal table 250 illustrating a main thermal table 252 and sub tables 254*a-d* associated with different device configurations. It should be understood that the generated thermal table can include thermal parameters for handheld and docked device configurations and, as such, the system can utilize the variable integer value to determine a relevant thermal sub table.

Returning to FIG. 2, in step 208, the system can optimize device performance by dynamically switching device configuration thermal parameters for the stored initial device configuration based on the one or more detected hardware attachment or detachment events and a thermal table. For example, in response to a detected docking event, the system can look up a docked device configuration thermal sub-table based on the set variable value (e.g., 1 where DOCKED=TRUE) and dynamically switch the un-docked device configuration thermal parameters by setting the device processor (e.g., central processing unit (CPU)) throttle trip temperature to a docked device configuration trip temperature. Alternatively, in response to a detected un-docking event, the system can look up a handheld device configuration thermal sub-table based on the set variable value (e.g., 0 where DOCKED=FALSE) and dynamically switch the docked device configuration thermal parameters by setting the device CPU throttle trip temperature to a handheld device configuration trip temperature.

Figure 4:
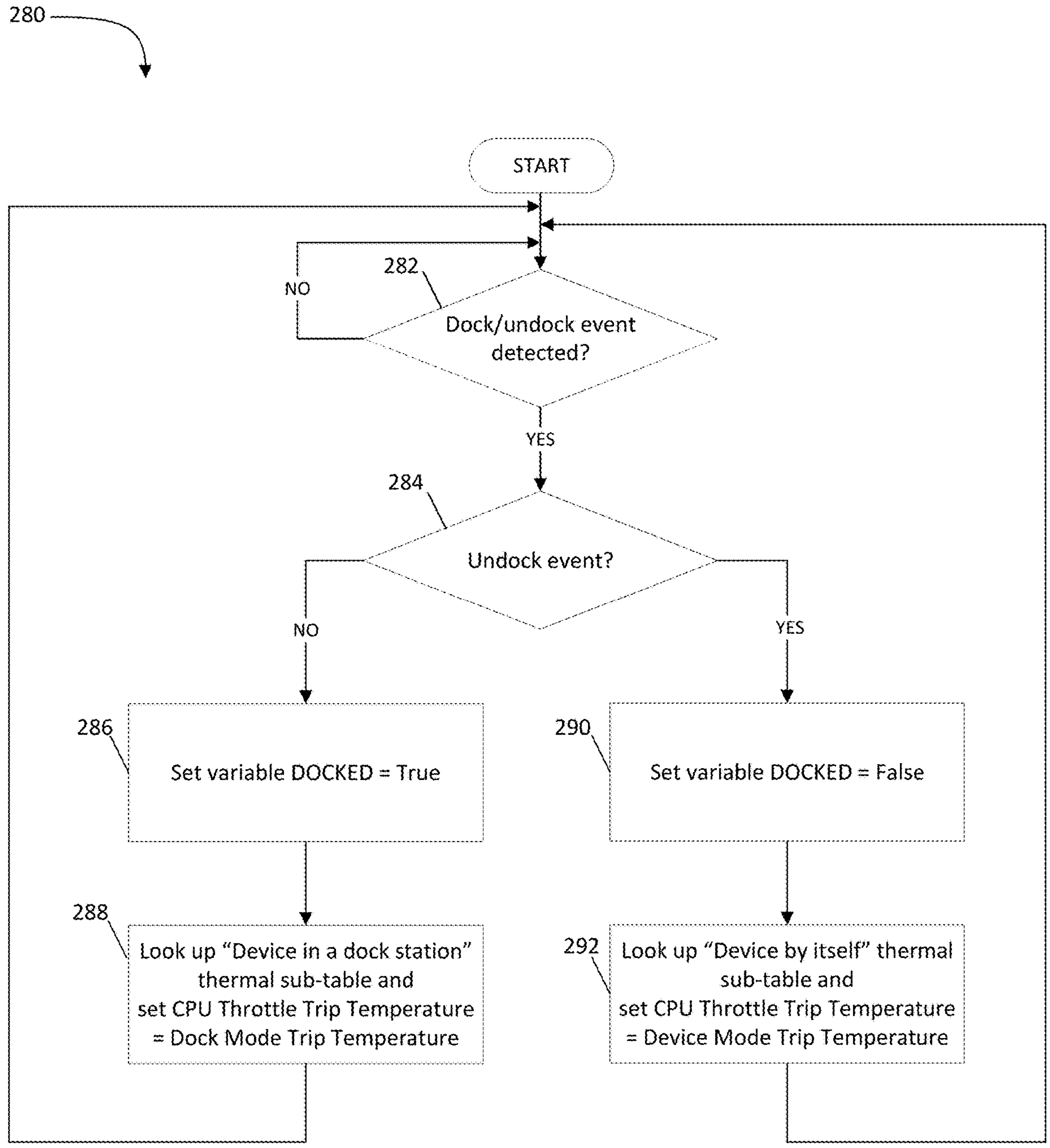
FIG. 4 is a flowchart illustrating processing steps carried out by the system of FIG. 2 for device configuration.

FIG. 4 is a flowchart 280 illustrating processing steps carried out by the system of FIG. 2 for device configuration. In step 282, the system determines whether a hardware attachment (e.g., docking) or detachment (e.g., un-docking) event is detected. The system can utilize a real time detection mechanism (e.g., one or more detection pins) to detect the hardware (e.g., a keyboard or dock) attachment or detachment event in real time. If the system determines that a hardware attachment or detachment event is not detected, then the process returns to step 282 (e.g., the process is restarted). If the system determines that a hardware attachment or detachment event is detected, then the process proceeds to step 284.

In step 284, the system determines whether a detected event is a hardware detachment (e.g., un-docking) event. If the system determines that a detected event is not a hardware detachment event, then the process proceeds to step 286.

The system can set an integer value of a variable in response to a detected hardware attachment or detachment event. In step 286, in response to a determined docking event, the system can set the variable value to one which is indicative of a docked device configuration (e.g., DOCKED=TRUE). Then, in step 288, the system can look up a docked device configuration thermal sub-table based on the set variable value (e.g., 1 where DOCKED=TRUE) and dynamically switch the un-docked device configuration thermal parameters by setting the device processor (e.g., central processing unit (CPU)) throttle trip temperature to a docked device configuration trip temperature.

Alternatively, if the system determines that a detected event is a hardware detachment event, then the process proceeds to step 290. In step 290, in response to a determined un-docking event, the system can set the variable value to zero which is indicative of a handheld device configuration (e.g., DOCKED=FALSE). Then, in step 292, the system can look up a handheld device configuration thermal sub-table based on the set variable value (e.g., 0 where DOCKED=FALSE) and dynamically switch the docked device configuration thermal parameters by setting the device CPU throttle trip temperature to a handheld device configuration trip temperature.

As such, the system can optimize device performance by dynamically switching device configuration thermal parameters for the initial device configuration based on one or more detected hardware attachment or detachment events and a thermal table.

Figure 5:
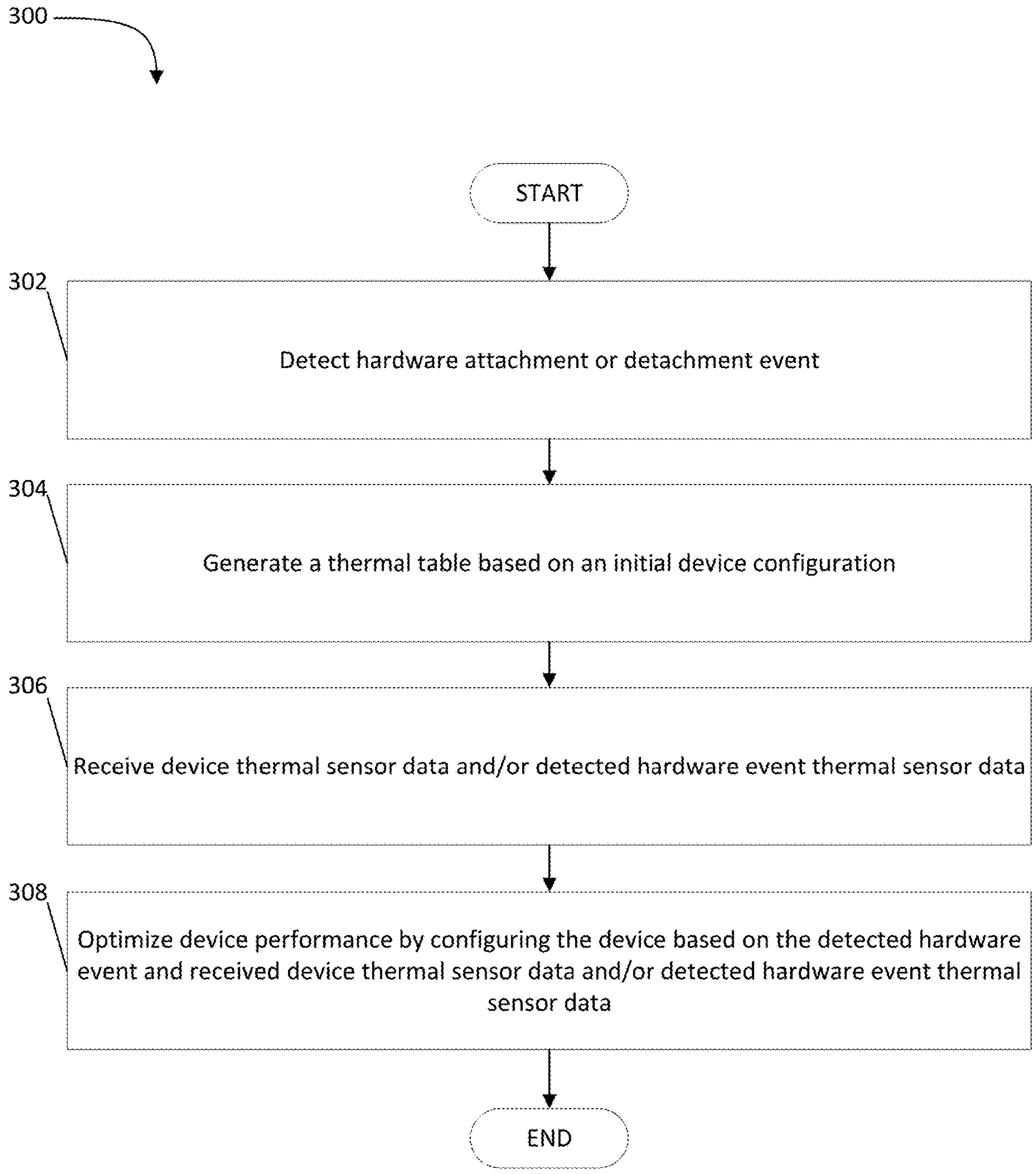
FIG. 5 is a flowchart illustrating overall processing steps carried out by another embodiment of the system of the present disclosure.

FIG. 5 is a flowchart 300 illustrating overall processing steps carried out by another embodiment of the system of the present disclosure. As described in further detail below, the system can detect a device configuration via a real time detection mechanism (e.g., one or more detection pins), generate a thermal table based on an initial device configuration, receive thermal sensor data from the device and/or detected hardware, and optimize device performance by dynamically switching device configuration thermal parameters, while the device is running, based on the detected device configuration and received thermal sensor data. As such, the system can process a plurality of device configurations based on a single thermal table.

Beginning in step 302, the system can utilize a real time detection mechanism (e.g., one or more detection pins) to detect a hardware (e.g., a keyboard or dock) attachment and detachment event in real time and can set an integer value of a variable in response to the detected hardware attachment or detachment event. For example, in response to a detected docking event, the system can set the variable value to one which is indicative of a docked device configuration (e.g., DOCKED=TRUE). Alternatively, in response to a detected un-docking event, the system can set the variable value to zero which is indicative of a handheld device configuration (e.g., DOCKED=FALSE).

In step 304, the system can generate a thermal table based on an initial device configuration. For example, the generated thermal table can be based on a handheld device configuration, a docked device configuration or a docked with attached accessory device configuration. In step 306, the system can receive thermal sensor data in real time from at least one thermal sensor of the device or detected hardware. It should be understood that the system can generate the thermal table based on an initial device configuration before or after detecting a hardware attachment and detachment event.

In step 308, the system can optimize device performance by dynamically switching device configuration thermal parameters for the initial device configuration based on the detected hardware attachment or detachment event and the received thermal sensor data of the device or detected hardware. As such, the system can efficiently utilize memory by accommodating a condensed thermal table indicative of an initial device configuration and comparing the thermal table with the received thermal sensor data in real time to dynamically switch device configuration thermal parameters for the initial device configuration.

For example, if a user docks a device having a handheld device configuration, then the performance of the device is limited because of a lower skin temperature requirement compared to a docked device configuration that has a higher skin temperature upper limit requirement. As such, the system utilizes the received thermal sensor data from at least one thermal sensor (e.g., of the device or the dock) to determine a final thermal sensor value for the at least one thermal sensor and optimizes the performance of the device based on the final thermal sensor value. For example, the system can determine a final thermal sensor value according to Equation 1 below:

$$\text{Thermal sensor } 1_{FINAL} = \text{Thermal sensor } 1_{ACTUAL\ READING} - \Delta_{TEMPERATURE} \qquad \text{Equation 1}$$

The system can optimize the performance of the device by determining whether to throttle a CPU of the device based on the final thermal sensor value. It should be understood that the system determines the $\Delta_{TEMPERATURE}$ value based on a plurality of thermal trials to optimize the $\Delta_{TEMPERATURE}$ value to yield improved device performance and skin temperature balance. This process can be repeated for additional thermal sensors and different device configurations to determine different $\Delta_{TEMPERATURE}$ values. As such, the thermal table can accommodate a plurality of device configurations.

Figure 6:
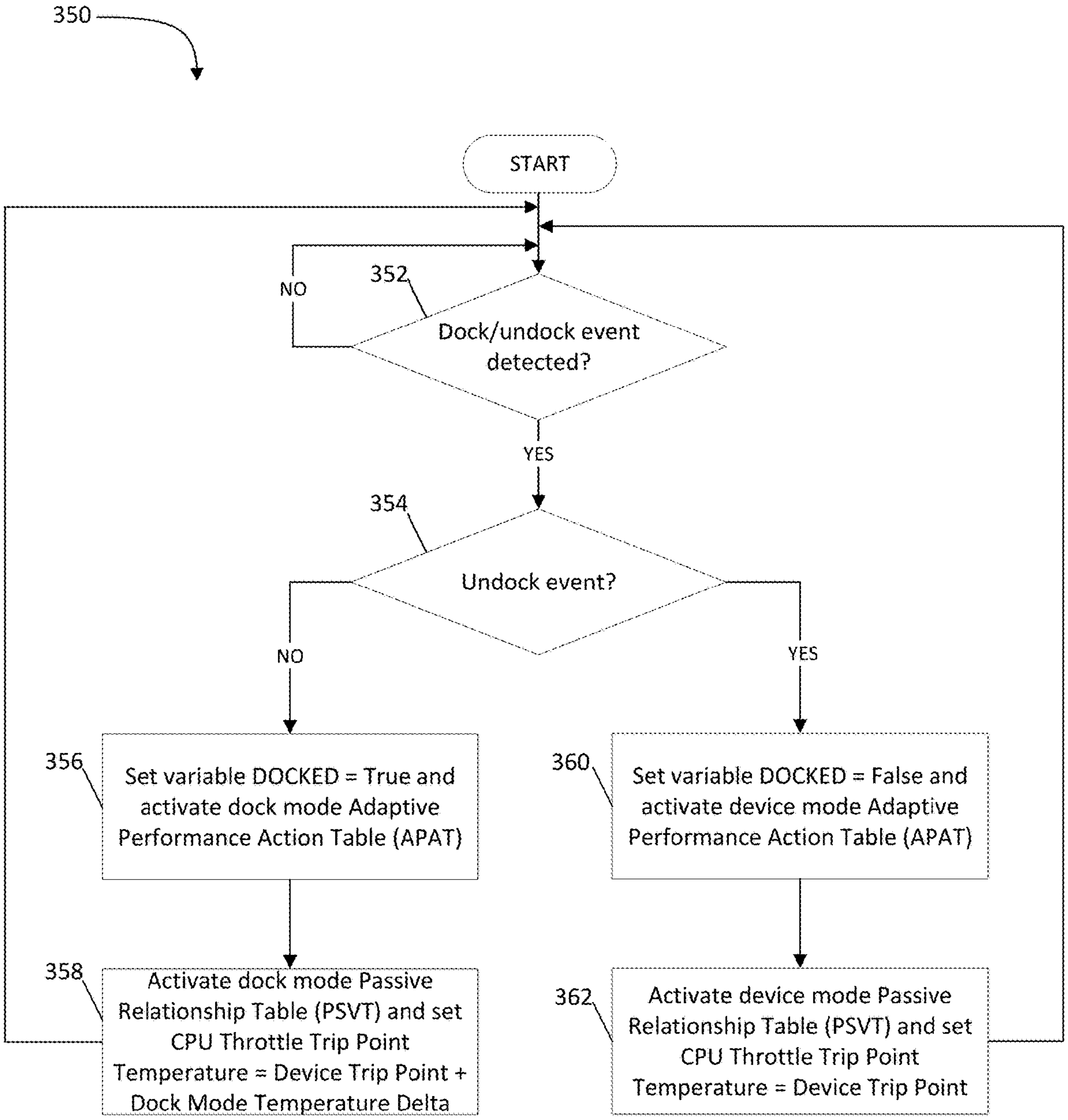
FIG. 6 is a flowchart illustrating processing steps carried out by the system of FIG. 5 for device configuration.

FIG. 6 is a flowchart 350 illustrating processing steps carried out by the system of FIG. 5 for device configuration. In step 352, the system determines whether a hardware attachment (e.g., docking) or detachment (e.g., un-docking) event is detected. The system can utilize a real time detection mechanism (e.g., one or more detection pins) to detect the hardware (e.g., a keyboard or dock) attachment or detachment event in real time. If the system determines that a hardware attachment or detachment event is not detected, then the process returns to step 352 (e.g., the process is restarted). If the system determines that a hardware attachment or detachment event is detected, then the process proceeds to step 354.

In step 354, the system determines whether a detected event is a hardware detachment (e.g., un-docking) event. If the system determines that a detected event is not a hardware detachment event, then the process proceeds to step 356.

The system can set an integer value of a variable in response to a detected hardware attachment or detachment event. In step 356, in response to a determined docking event, the system can set the variable value to one which is indicative of a docked device configuration (e.g., DOCKED=TRUE) and activate a dock mode Adaptive Performance Action Table (APAT). Then, in step 358, the system can activate a dock mode Passive Relationship Table (PSVT) and dynamically switch the un-docked device configuration thermal parameters by setting the device CPU throttle trip point temperature to a device (e.g., tablet) trip point with a dock mode temperature delta.

Alternatively, if the system determines that a detected event is a hardware detachment event, then the process proceeds to step 360. In step 360, in response to a determined un-docking event, the system can set the variable value to zero which is indicative of a handheld device configuration (e.g., DOCKED=FALSE) and activate a device (e.g., tablet) mode APAT. Then, in step 362, the system can activate a device mode PSVT and dynamically switch the un-docked device configuration thermal parameters by setting the device CPU throttle trip point temperature to a device (e.g., tablet) trip point.

It should be understood that the embodiments of FIGS. 2 and 5 are not mutually exclusive and can be used alone or in combination based on system design criteria including, but not limited to, available memory to accommodate one or more tables and switching latency requirements.

Figures 7A, 7B, 7C:
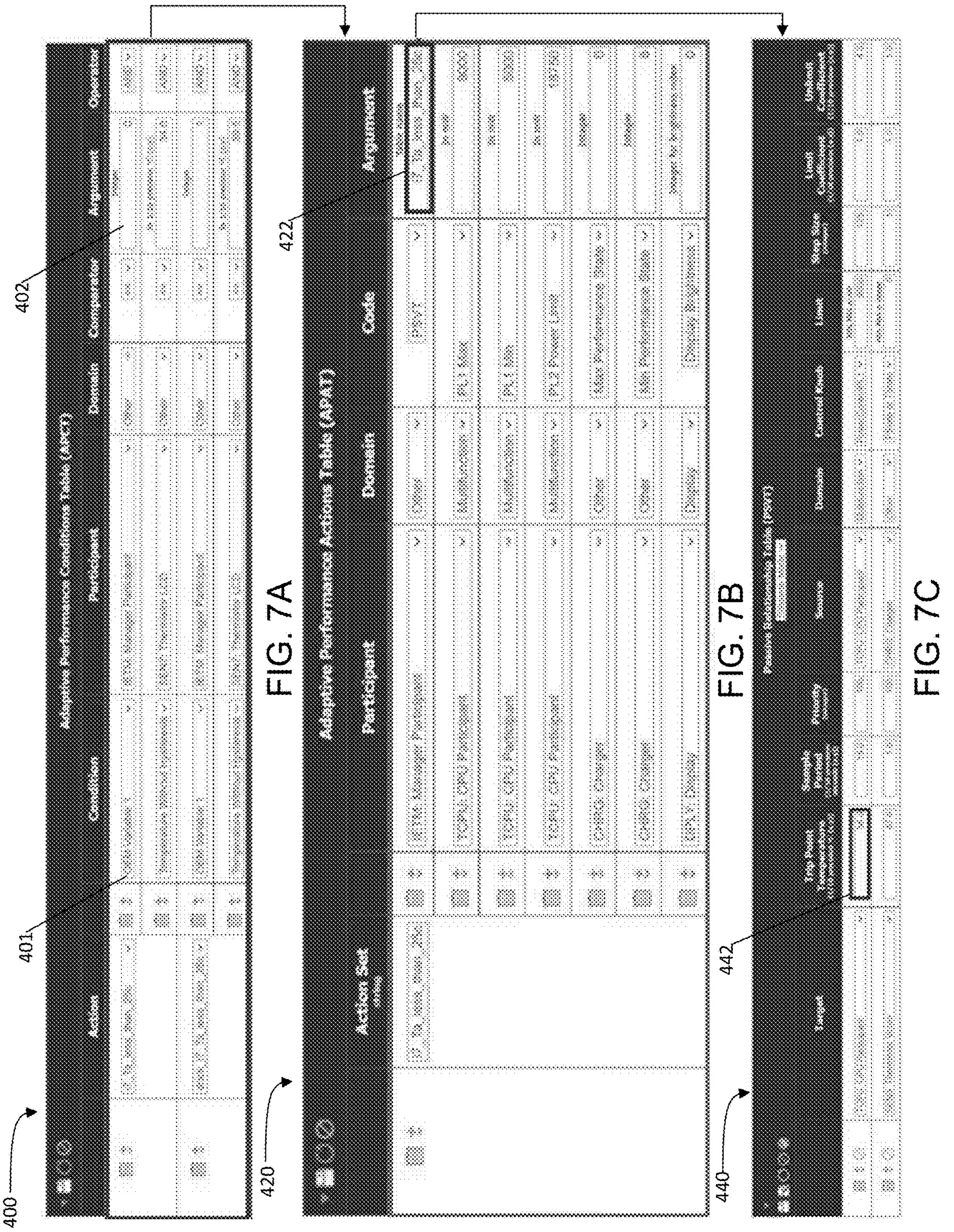
FIGS. 7A-C are dynamic tuning tables illustrating a handheld device configuration.

FIGS. 7A-C are dynamic tuning tables illustrating a handheld device configuration. As shown in FIG. 7A, in response to a determined un-docking event, an adaptive performance conditions table (APCT) 400 can set a variable 401 (e.g., "OEM Variable 1") to an integer value 402 of zero which is indicative of a handheld device configuration (e.g., DOCKED=FALSE). As shown in FIG. 7B, setting the variable 401 to an integer value 402 of zero (e.g., OEM Variable 1=0) yields a handheld device (e.g., tablet) mode APAT 420 specifying a PSVT attribute 422 (e.g., "i7_Ta_less_than_25c"). As shown in FIG. 7C, the PSVT attribute 422 yields a PSVT 440 setting a trip point temperature 442 to 58° C. (e.g., equivalent to the device trip point temperature).

Figure 8A:
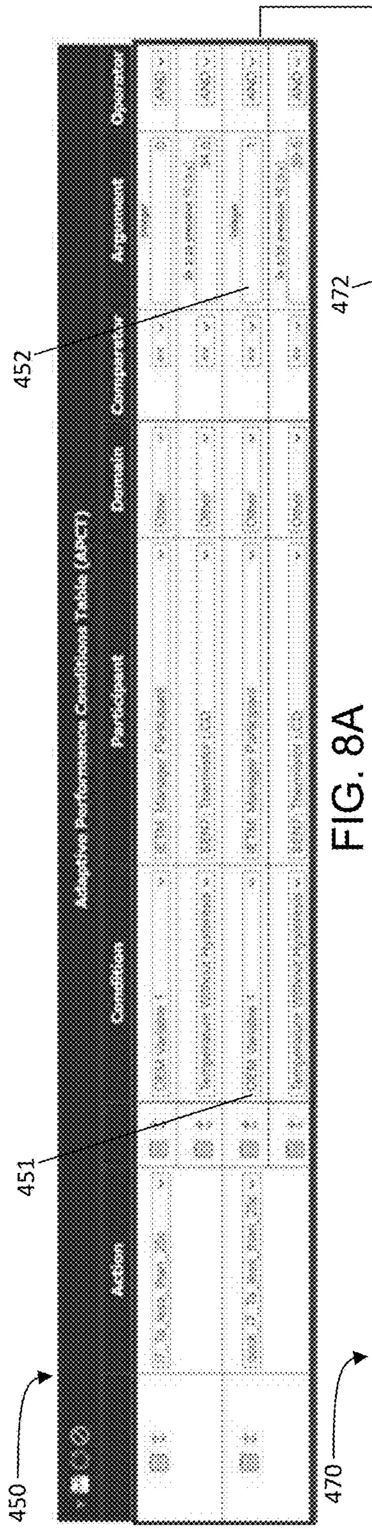
FIGS. 8A-C are dynamic tuning tables illustrating an attached accessory device configuration or a docked device configuration.
Figure 8B:
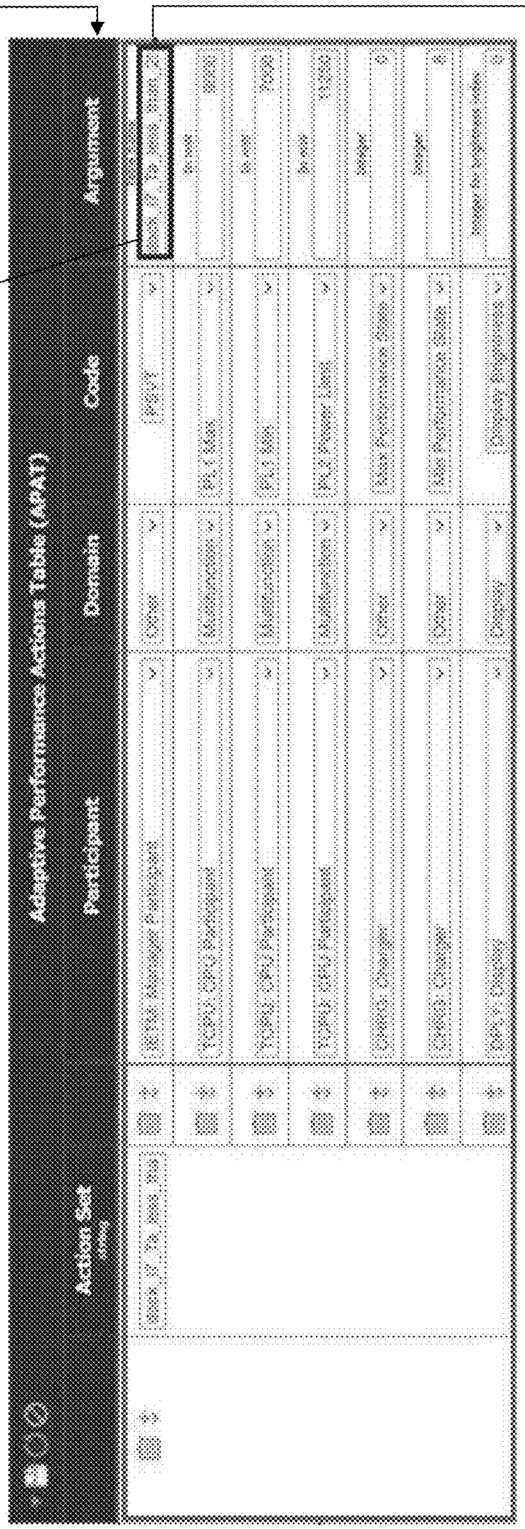
Figure 8C:
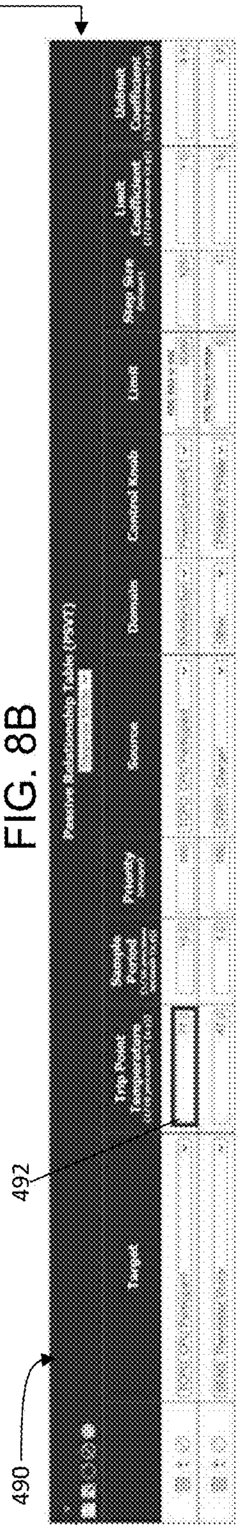

FIGS. 8A-C are dynamic tuning tables illustrating an attached accessory device configuration or a docked device configuration. As shown in FIG. 8A, in response to a determined docking event, an APCT 450 can set a variable 451 (e.g., "OEM Variable 1") to an integer value 452 of one which is indicative of a docked device configuration (e.g., DOCKED=TRUE). As shown in FIG. 8B, setting the variable 451 to an integer value 452 of one (e.g., OEM Variable 1=1) yields a dock mode APAT 470 specifying a PSVT attribute 472 (e.g., "dock_i7_Ta_less_than_25c"). As shown in FIG. 8C, the PSVT attribute 472 yields a PSVT 490 setting a trip point temperature 492 to 77° C. (e.g., equivalent to the device trip point temperature and the dock mode temperature delta).

Figure 9A:
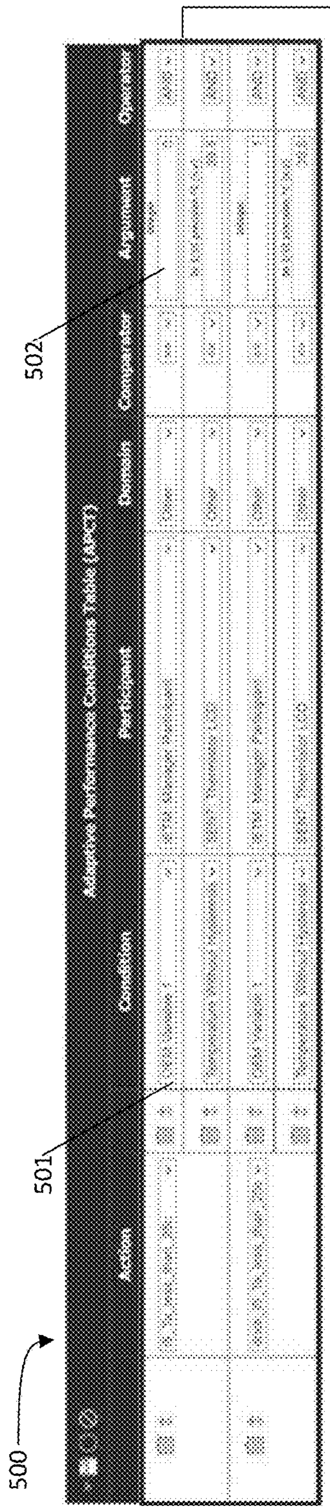
FIGS. 9A-C are dynamic tuning tables illustrating a handheld device configuration.
Figure 9B:
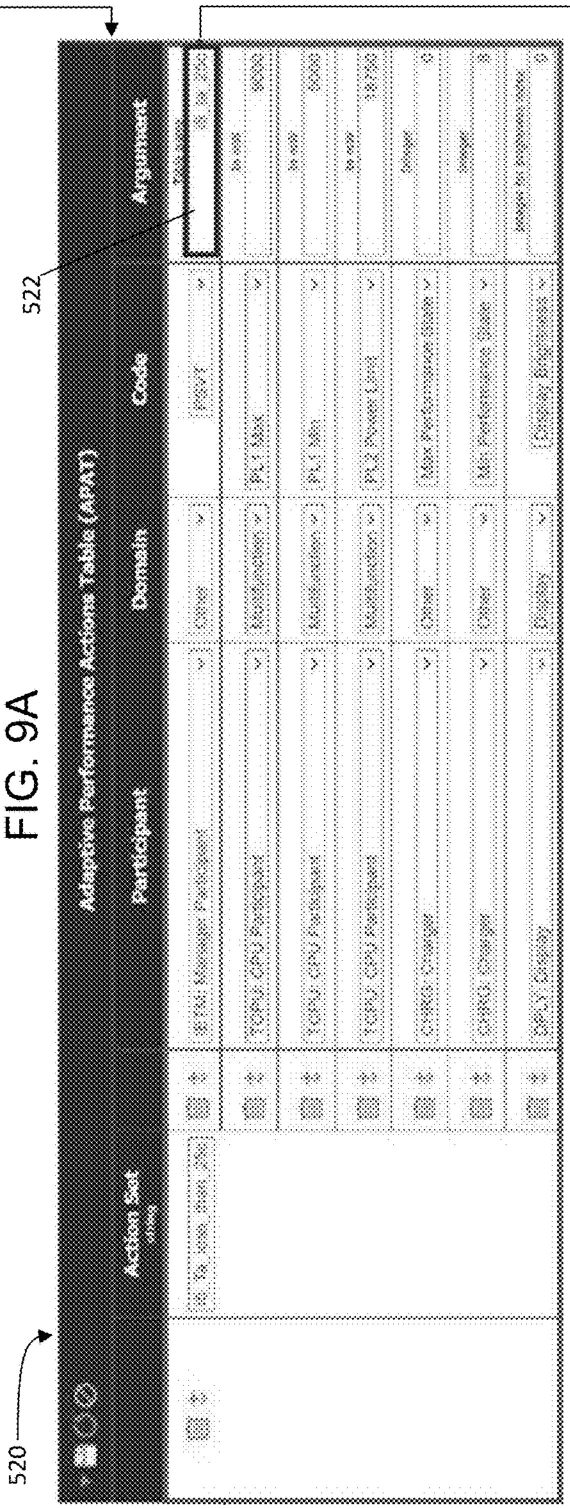
Figure 9C:
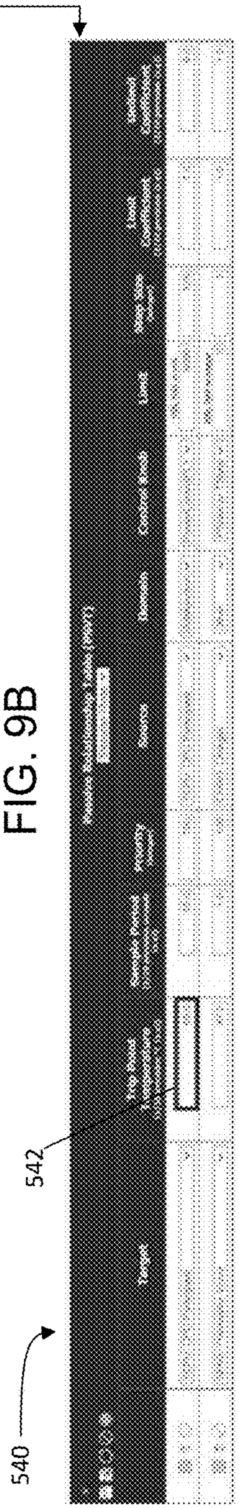

FIGS. 9A-C are dynamic tuning tables illustrating a handheld device configuration. As shown in FIG. 9A, in response to a determined un-docking event, an APCT 500 can set a variable 501 (e.g., OEM Variable 1") to an integer value 502 of zero which is indicative of a handheld device configuration (e.g., DOCKED=FALSE). As shown in FIG. 9B, setting the variable 501 to an integer value 502 of zero (e.g., OEM Variable 1=0) yields a handheld device (e.g., tablet) mode APAT 520 specifying a PSVT attribute 522 (e.g., "i5_ta_25c"). As shown in FIG. 9C, the PSVT attribute 522 yields a PSVT 540 setting a trip point temperature 542 to 55° C. (e.g., equivalent to the device trip point temperature).

Figures 10A, 10B, 10C:
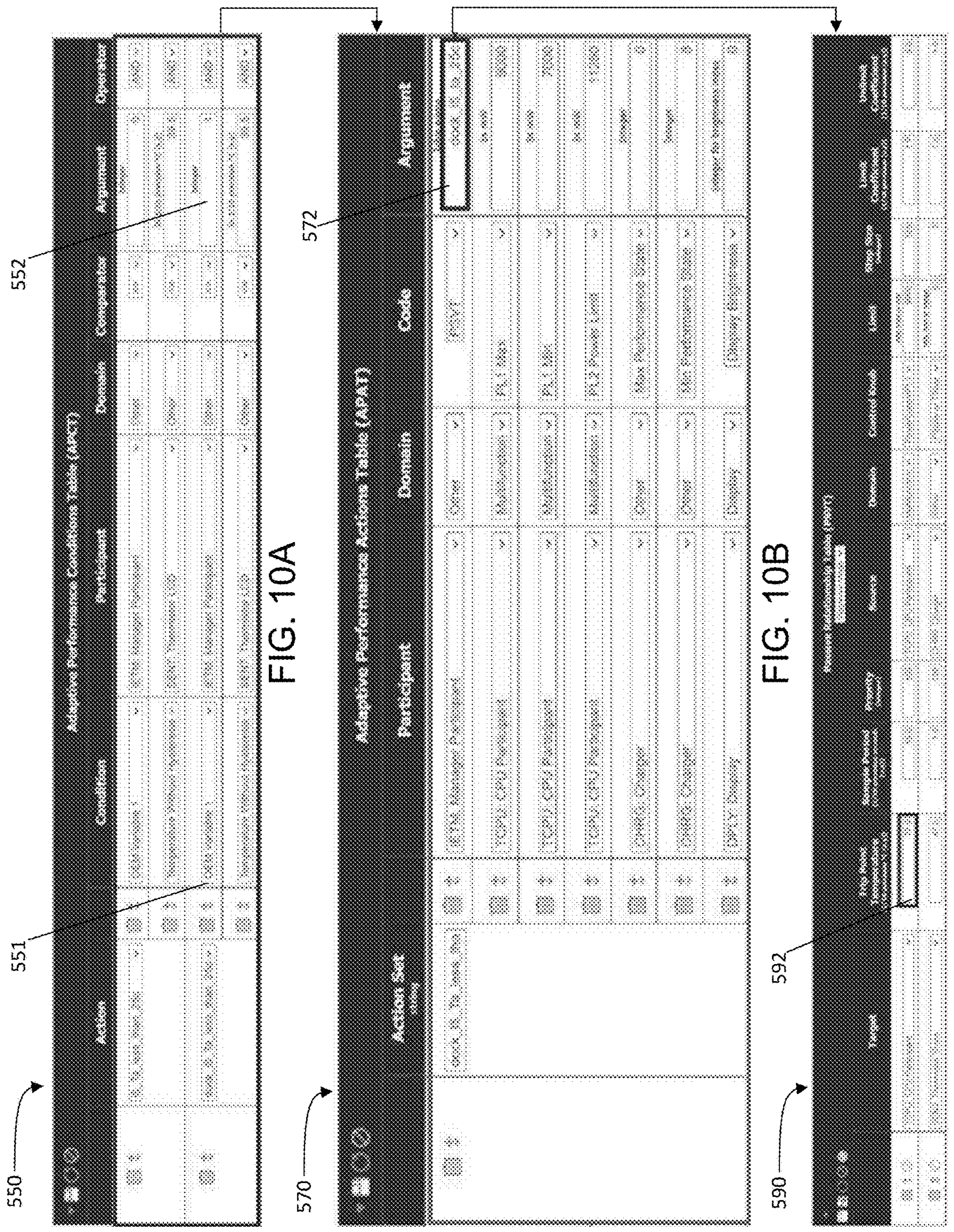
FIGS. 10A-C are dynamic tuning tables illustrating an attached accessory device configuration or a docked device configuration.

FIGS. 10A-C are dynamic tuning tables illustrating an attached accessory device configuration or a docked device configuration. As shown in FIG. 10A, in response to a determined docking event, an APCT 550 can set a variable 551 (e.g., "OEM Variable 1") to an integer value 552 of one which is indicative of a docked device configuration (e.g., DOCKED=TRUE). As shown in FIG. 10B, setting the variable 551 to an integer value 552 of one (e.g., OEM Variable 1=1) yields a dock mode APAT 570 specifying a PSVT attribute 572 (e.g., "dock_i5_Ta_25c"). As shown in FIG. 10C, the PSVT attribute 572 yields a PSVT 590 setting a trip point temperature 592 to 77° C. (e.g., equivalent to the device trip point temperature and the dock mode temperature delta).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A system for dynamically switching thermal parameters of a device:

a memory configured to store computer executable instructions; and a processor configured to interface with the memory and execute the computer executable instructions to cause the processor to:

detect a hardware attachment or detachment event via a detection mechanism of the device, store an initial configuration of the device and the detected hardware attachment or detachment event, generate a table having one or more sub tables based on the stored initial device configuration and the detected hardware attachment or detachment event, and optimize performance of the device by dynamically switching the thermal parameters of the device based on the stored initial device configuration, the detected hardware attachment or detachment event and thermal sensor data from detected hardware, wherein dynamically switching the thermal parameters comprises switching from a first dynamic thermal tuning (DTT) table associated with the stored initial device configuration to a second DTT table associated with the detected hardware attachment or detachment event while an operating system of the device is in a running state and without shutting down, cold booting, or warm booting the device.

2. The system of claim 1, wherein the processor is further configured to:

set, in response to detecting the hardware attachment event, a value indicative of a hardware attachment configuration, select a sub table among one or more sub tables based on type of the detected hardware attachment configuration, and set a temperature point associated with the selected sub table for the type of detected hardware attachment configuration.

3. The system of claim 2, wherein the hardware attachment configuration is at least one of a docked device configuration and an attached accessory device configuration, the attached accessory being at least one of a mouse, a keyboard, a headset, and a heads-up display.

4. The system of claim 1, wherein the processor is further configured to:

set, in response to detecting the hardware detachment event, a value indicative of a hardware detachment configuration, select a sub table among one or more sub tables based on type of the detected hardware detachment configuration, and set a temperature point associated with the selected sub table for the type of detected hardware detachment configuration.

5. The system of claim 4, wherein the hardware detachment configuration is a standalone device configuration, the device being at least one of a mobile phone, a tablet, and a laptop.

6. A method for dynamically switching thermal parameters of a device, comprising:

detecting a hardware attachment or detachment event via a detection mechanism of the device;

storing an initial configuration of the device and the detected hardware attachment or detachment event;

generating a table having one or more sub tables based on the stored initial device configuration and the detected hardware attachment or detachment event; and optimizing performance of the device by dynamically switching the thermal parameters of the device based on the stored initial device configuration, the detected hardware attachment or detachment event and thermal sensor data from detected hardware, wherein dynamically switching the thermal parameters comprises switching from a first dynamic thermal tuning (DTT) table associated with the stored initial device configuration to a second DTT table associated with the detected hardware attachment or detachment event while an operating system of the device is in a running state and without shutting down, cold booting, or warm booting the device.

7. The method of claim 6, further comprising:

setting, in response to detecting a hardware attachment event, a value indicative of a hardware attachment configuration;

selecting a sub table among one or more sub tables based on a type of the detected hardware attachment configuration; and setting a temperature point associated with the selected sub table for the type of detected hardware attachment configuration.

8. The method of claim 7, wherein the hardware attachment configuration is at least one of a docked device configuration and an attached accessory device configuration, the attached accessory being at least one of a mouse, a keyboard, a headset, and a heads-up display.

9. The method of claim 6, further comprising:

setting, in response to detecting a hardware detachment event, a value indicative of a hardware detachment configuration;

selecting a sub table among one or more sub tables based on a type of the detected hardware detachment configuration; and setting a temperature point associated with the selected sub table for the type of detected hardware detachment configuration.

10. The method of claim 9, wherein the hardware detachment configuration is a standalone device configuration, the device being at least one of a mobile phone, a tablet, and a laptop.

* * * * *